United States Patent [19]

Kobari et al.

[11] Patent Number: 5,219,178
[45] Date of Patent: Jun. 15, 1993

[54] AIR BAG INFLATION GAS GENERATOR

[75] Inventors: Hirokazu Kobari; Junichi Kishimoto, both of Shirakawa; Michio Shioda, Fukushima; Kazuhiro Seki; Kanichi Fukuda, both of Wako, all of Japan

[73] Assignee: Nippon Koki Co., Ltd., Tokyo, Japan

[21] Appl. No.: 751,713

[22] Filed: Aug. 29, 1991

[30] Foreign Application Priority Data

Oct. 8, 1990 [JP] Japan .................................. 2-271885
Oct. 8, 1990 [JP] Japan .................................. 2-271886
Mar. 1, 1991 [JP] Japan .................................. 3-36016

[51] Int. Cl.⁵ ............................................. B60R 21/26
[52] U.S. Cl. ................................. 280/736; 280/741;
280/732; 422/165; 422/166; 422/167; 422/305
[58] Field of Search ............... 422/165, 166, 167, 305;
280/741, 736, 732; 102/530, 531

[56] References Cited

U.S. PATENT DOCUMENTS

| | | | |
|---|---|---|---|
| 4,158,696 | 6/1979 | Wilhelm | 422/167 |
| 4,380,346 | 4/1983 | Davis et al. | 422/166 |
| 4,890,860 | 1/1990 | Schneiter | 422/166 |
| 5,033,390 | 7/1991 | Mirert et al. | 280/741 |

FOREIGN PATENT DOCUMENTS

| | | | |
|---|---|---|---|
| 0033610 | 8/1981 | European Pat. Off. | 280/741 |
| 2420411 | 11/1974 | Fed. Rep. of Germany | 280/741 |
| 2330194 | 12/1974 | Fed. Rep. of Germany | 280/740 |

*Primary Examiner*—Robert J. Warden
*Assistant Examiner*—Laura E. Collins
*Attorney, Agent, or Firm*—Kalish & Gilster

[57] ABSTRACT

This invention relates to an air bag inflation gas generator to feed gas for inflation of air bags such as air bags for absorbing collision shocks, life jackets, rubber, rafts, and escape chutes. The present invention comprises combustion chambers accommodating gas generating agents formed with separating members in the both ends of an elongate cylinder having gas outlets in the middle thereof, a cylindrical final filter installed inside the middle of the cylinder, intermediary filters installed between the final filter and the separating members in the cylinder, and orifices, facing toward the intermediary filters, opened at the separating members. The present invention may generate much larger volume of combustion gas generated from gas generating agents than the prior generators, purify a large volume of combustion gas completely, and control the burning of gas generating agents.

12 Claims, 9 Drawing Sheets

Prior Art

AIR BAG INFLATION GAS GENERATOR

BACKGROUND OF THE INVENTION

1. Field of the Invention

This invention relates to an air bag inflation gas generator to feed gas for inflation of air bags such as air bags for absorbing collision shocks, life jackets, rubber, rafts, and escape chutes.

2. Description of the Prior Art

A prior shock absorber to protect a car driver from shocks at collision accidents comprises an air bag, for example, having a capacity of 60 liters and a gas generator to inflate the air bag with gas. At a collision accident, explosives or other gas generating agents having a similar composition thereto, which are charged in the gas generator, are ignited and burnt to produce some gas. The air bag is instantaneously inflated by the resultant gas for driver protection against any collision shocks, which can avoid possible serious injury.

Figure 13:
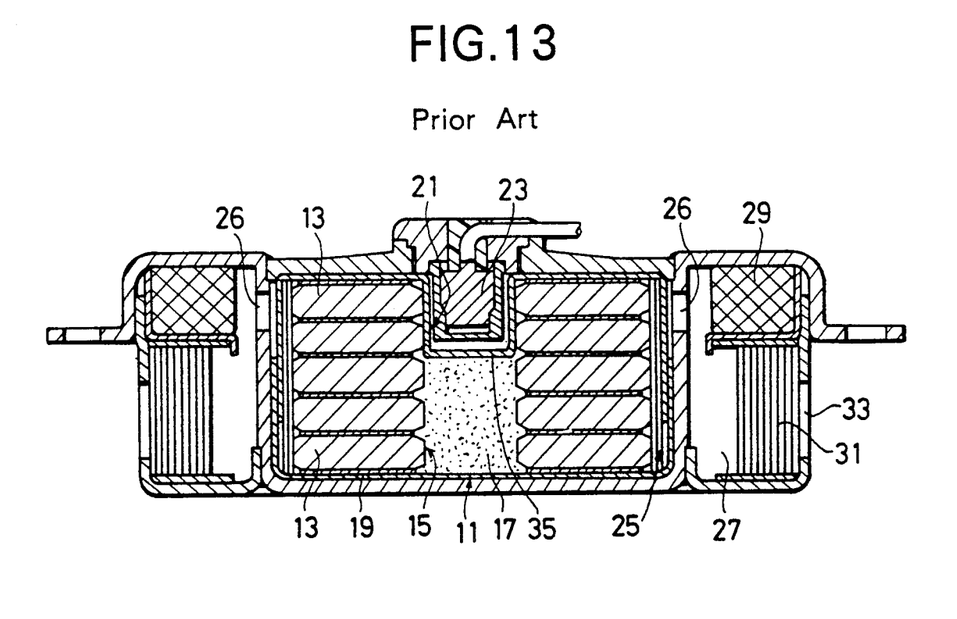
FIG. 13 is a longitudinal sectional view of a prior air bag inflation gas generator.

FIG. 13 shows a prior air bag inflation gas generator disclosed in the Japanese Patent Laid-open No. 2-155857. In the drawing, the reference numeral 11 shows a combustion chamber accommodating a plurality of layers of gas generating agents 13.

The gas generating agents 13 have disc-like construction having a through hole 15 in the center thereof and the through hole 15 contains an ignition agent 17. These gas generating agents 13 are contained in a sealed vessel 19 which has a recess 21 in the center thereof denting into the through hole 15 in the gas generating agents 13. An igniter 23 for combustion of the gas generating agents is installed in the recess 21. A combustion chamber filter 25 is provided along the inner wall of the combustion chamber 11, and a plenum chamber 27 into which gas flows through orifices 26 after passing through the combustion chamber filter 25 annularly surrounds the combustion chamber 11. The plenum chamber 27 contains plenum chamber filters consisting of an upper filter 29 and a gas filter 31. The plenum chamber 27 further includes gas outlets 33 to feed the gas into an air bag through the gas filter 31.

In this type of air bag inflation gas generator, when an electric current is applied to the igniter 23, the ignition agent 17 burns by burning of explosives in the igniter 23. This burning causes the gas generating agents 13 to burn and the resultant gas flows into the plenum chamber 27 through the combustion chamber filter 19 arranged along the inner wall of the combustion chamber 11. The gas is purified by the upper filter 29 and the gas filter 31 and flows into the air bag through the gas outlets 33. The air bag can be inflated completely within a very short time, for example, approximately 0.04 second.

In this prior air bag inflation gas generator, volume of combustion gas generated from the gas generating agents 13 and furthermore purification efficiency for the combustion gas have limits.

Particularly for inflation of an air bag for a front passenger seat, a large capacity air bag being about 2.5 times, for example, as much as a prior air bag for a driver is necessary because passenger condition of the front passenger seat is different from the driver's with the result that the passenger does not have a certain position and the passenger varies in physique from a child to an adult. There was demanded an air bag inflation gas generator supplying a large volume of gas generated from the gas generating agents and furthermore able to purify such a large volume of gas completely.

In the Japanese Patent Laid-open No. 1-297336, an air bag inflation gas generator having a construction in which gas generating agents are installed in the center of a cylinder and to be burnt by an igniter for feeding a combustion gas through gas outlets at the cylinder into the air bag is disclosed. In this generator, the gas outlets formed at the cylinder cause the combustion gas to flow into the air bag more efficiently than the prior art. However, because the gas generating agents are tablet in shape, the combustion surface area of the gas generating agents at the start of burning is large, resulting a large volume of gas, which causes a problem that the air bag is abruptly inflated.

In the Japanese Patent Laid-open No. 1-289736, an air bag inflation gas generator having two or more generators for a driver mounted on a specified pedestal is disclosed. In this equipment, because two igniters are used, ignition of them can be controlled. However, two or more generators installed for a driver prevent decrease in weight and size. Therefore, a large volume of combustion gas can not be fed into an air bag effectively.

SUMMARY OF THE INVENTION

An object of the present invention is to solve the above problems and to provide an air bag inflation gas generator generating a much larger volume of combustion gas from gas generating agents than the prior generators, purifying a large volume of combustion gas completely, and controlling the burning of gas generating agents.

Another object of the present invention is to provide an air bag inflation gas generator which ignites gas generating agents in combustion chambers in both ends of the generator respectively.

Still another object of the present invention is to provide an air bag inflation gas generator which controls capacity per time of deploying the air bag to a best condition by increasing combustion surface area of gas generating agents, which start to burn later, in the second combustion chamber than that in the first combustion chamber, resulting in a larger volume per time of combustion gas in the second combustion chamber compared with that in the first combustion chamber.

A further object of the present invention is to provide an air bag inflation gas generator which ignites gas generating agents in the second combustion chamber after a certain time from the start of the burning of gas generating agents in the first combustion chamber.

An even further object of the present invention is to provide an air bag inflation gas generator which significantly increases purification efficiency of a final filter more than the prior generators.

DESCRIPTION OF THE PREFERRED EMBODIMENT OF THE INVENTION

The present invention will be described in detail with reference to the embodiments shown in the drawings below.

Figure 1:
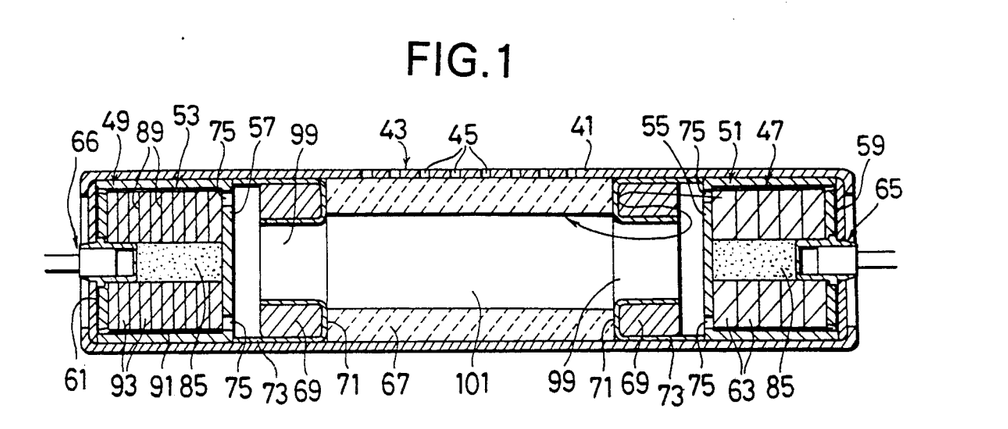
FIG. 1 is a longitudinal sectional view of an embodiment of the air bag inflation gas generator according to the present invention.

FIG. 1 shows one embodiment of the air bag inflation gas generator according to the present invention. In the drawing, the reference numeral 41 shows an elongate cylinder.

A plurality of gas outlets 45 are formed in the upper side of the middle 43 of the cylinder 41.

In both ends of the cylinder 41, combustion chambers 51, 53 accommodating gas generating agent packs 47, 49 are formed with separating members 55, 57 and lids 59, 61.

In the center of the lids 59, 61 in the both sides of the cylinder 41, igniters 65, 66 for igniting gas generating agents 63, 93 in the combustion chambers 51, 53 are axially installed in the cylinder 41.

In this embodiment, the igniter 66 in the second end is constructed to operate about 10-20 msec after operation of the igniter 65 in the first end.

A cylindrical final filter 67 is installed inside the middle 43 of the cylinder 41.

The final filter 67 is made of wraparound wire gauze or woven metal wire for instance, cools down the combustion gas to such a low temperature that the air bag may not be fired, removes any combustion residue contained in the gas, and feeds only harmless nitrogen gas to the air bag.

Between the final filter 67 and the separating members 55, 57, in the cylinder 41 intermediary filters 69 are arranged.

The intermediary filters 69 are accommodated in annular partitions 73 having a bottom 71 on each side of the final filter 67.

A plurality of orifices 75 are opened in the separating members 55, 57, facing toward the intermediary filters 69.

The intermediary filters 69 are formed by press molding stainless steel knitted wire cloth. Since the combustion gas flow bursting out of the orifices 75 at a high rate dashes into the intermediary filters 69, the intermediary filters 69 serve to change the gas flow into turbulent flow so that any combustion gas residue is caught in the filter.

Figure 2:
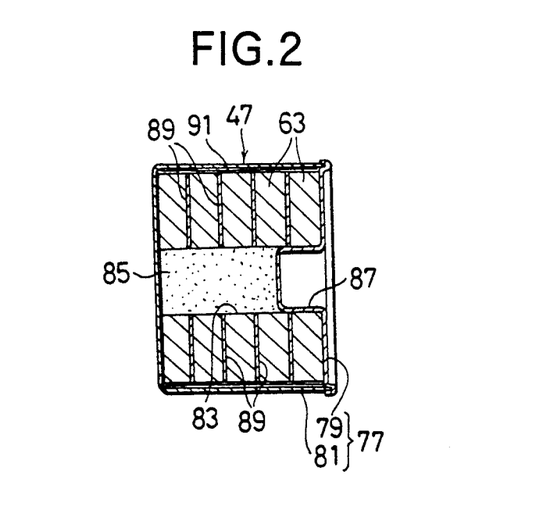
FIG. 2 is a longitudinal sectional view of a gas generating agents pack accommodated in the first combustion chamber of the gas generator shown in FIG. 1.

FIG. 2 shows the gas generating agents pack 47 accommodated in the first combustion chamber 51 in detail. In the drawing, the reference numeral 77 shows a sealed vessel consisting of aluminum cap 79 and cup 81.

In the sealed vessel 77, five gas generating agents 63 are arranged in the direction along the axial of the cylinder 41 in piled up shape, for example.

Each gas generating agent 63 is formed in disc-like shape having a through hole 83 in the center thereof. The through hole 83 is charged with an ignition agent 85.

A recess 87 is formed in the side of the lid 59 of the sealed vessel 77 and the igniter 65 is inserted into the recess 87.

Between each of gas generating agents 63, a separator 89 is installed.

These separators 89 are made of disc-like stainless steel wire cloth of 10-45 mesh, for example, improve ignitability of the gas generating agents 63 and ensure enough exhaust passages for the gas generating agents 63.

Furthermore, along the inner wall of the gas generating agent pack 47, a combustion chamber filter 91, for example, made of wraparound stainless steel wire cloth of 10-35 mesh is installed. The combustion chamber filter 91 removes any combustion gas residue contained in the gas generated from the gas generating agents 63, cools down the gas and ensures enough exhaust passages for the gas.

In the second gas generating agent pack 49, there are ten gas generating agents 93 two times as many as and half the thickness of the gas generating agents 63 in the first combustion chamber 51. Excepting the above, it is constructed in the same way as the gas generating agents pack 47 shown in FIG. 2. Therefore, corresponding parts are shown with the same numerals and will not described in detail.

In the air bag inflation gas generator having the above construction, when an electric current is applied to the igniters 65, 66 installed in the combustion chambers 51, 53 at the both ends, the ignition agents 85 are ignited. Then the ignition causes the gas generating agents 63, 93 to burn and the pressure of the combustion gas breaks the sealed vessels 77. The combustion gas in turn flows into the intermediary filters 69 through the orifices 75 at the separating members 55, 57, collides with the partitions 73, turns over, flows into a room 101 surrounded by the final filter 67 through rooms 99 in the intermediary filters 69, is purified by the final filter 67, and flows into an air bag through the gas outlets 45.

In this embodiment, the igniter 66 in the second side is constructed to operate in about 10-20 msec often the operation of the igniter 65 in the first side'so that the gas generating agents 93 in the second side start to burn after a ceretain time from the start of burning of the gas generating agents 63 in the first side.

In the air bag inflation gas generator having the above construction, the capacity of the combustion gas generated from the gas generating agents may be remarkably increased compared with the prior generators, a large capacity of combustion gas is completely purified, and the burning of the gas generating agents may be easily controlled by forming the combustion chambers 51,53 accommodating the gas generating agents 63, 93 at the both ends of the elongate cylinder 41 having the gas outlets 45 in the middle 43 thereof with the separating members 55, 57, installing the cylindrical final filter 67 inside the middle 43 of the cylinder 41, installing the intermediary filters 69 between the final filter 67 and the separating members 55, 57 in the cylinder 41, and opening the orifices 75, facing toward the intermediary filters 69, in the separating members 55, 57.

In the air bag inflation gas generator having the above construction, because the combustion chambers 51, 53 are formed at the both sides of the cylinder 41 and the combustion gas may flow into the air bag through the gas outlets 45 in the middle 43 of the cylinder 41, the capacity of the combustion gas generated from the gas generating agents may remarkably increase as compared with the prior generators.

The combustion gas is purified by the separators 89 in the gas generating agent packs 47, 49, the combustion chamber filters 91, the intermediary filters 69 and the final filter 67 with the result that even a large capacity of combustion gas may be certainly purified.

Furthermore, the igniter 66 in the second side operates after a certain time from the operation of the igniter 65 in the first side so that the generating agents 93 in the second combustion chamber 53 start to burn, for example, after 10-20 msec from the start of the burning of the gas generating agents 63 in the first combustion chamber 51 with the result that a passenger may be fixed to a certain extent and in turn restricted completely.

Figure 3:
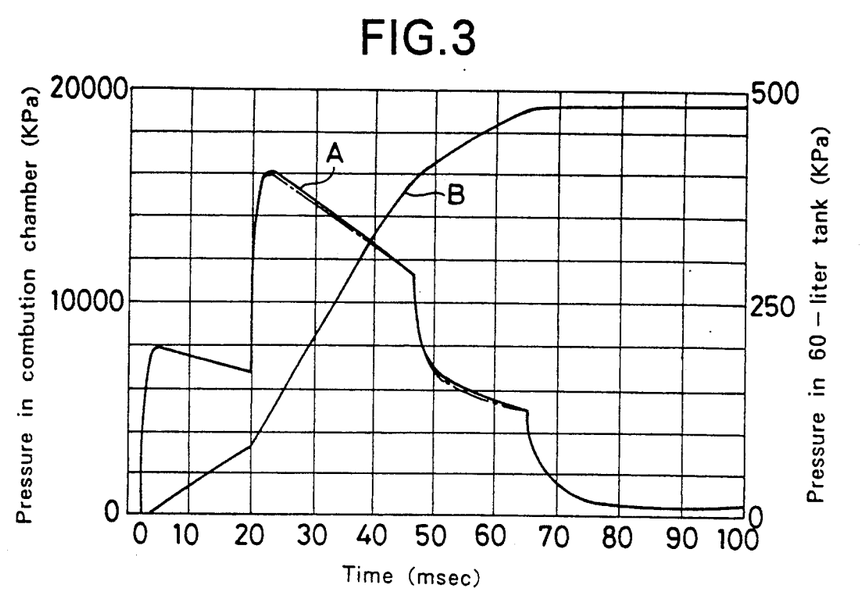
FIG. 3 is a graph showing changes of pressures in the first and second combustion chambers of the air bag inflation gas generator shown in FIG. 1, and in a 60-liter tank.

FIG. 3 shows capacity per time of generated combustion gas. In the drawing, the abscissa axis indicates time, the left vertical axis indicates pressures in the combustion chambers 51, 53, and the right vertical axis indicates pressure in a 60-liter tank. The curve A means changes of the pressures in the first combustion chamber 51 and the second combustion chamber 53, and the curve B means change of the pressure in the 60-liter tank into which combustion gas flows. The drawing proves that after 10-20 msec after the start of the burning of the gas generating agents 63 in the first combustion chamber 51 for instance, the gas generating agents 93 in the second combustion chamber 53 completely burn.

In the air bag inflation gas generator having the above construction, a plurality of annular gas generating agents 63, 93 are piled up axially in the combustion chambers 51, 53 and thickness of the gas generating agents 93 accommodated in the second combustion chamber 53 is thinner than that of the gas generating agents 63 accommodated in the first combustion chamber 51, so that the combustion specific surface area of the gas generating agents 93, which start to burn late, accommodated in the second combustion chamber 53 is larger than that of the gas generating agents 63 accommodated in the first combustion chamber 51 and volume per time of the combustion gas of the generating agents 93 is bigger than that of the gas generating agents 63 in the first combustion chamber with the result that capacity per time of deploying air bag may be controlled to a best condition.

Figure 4:
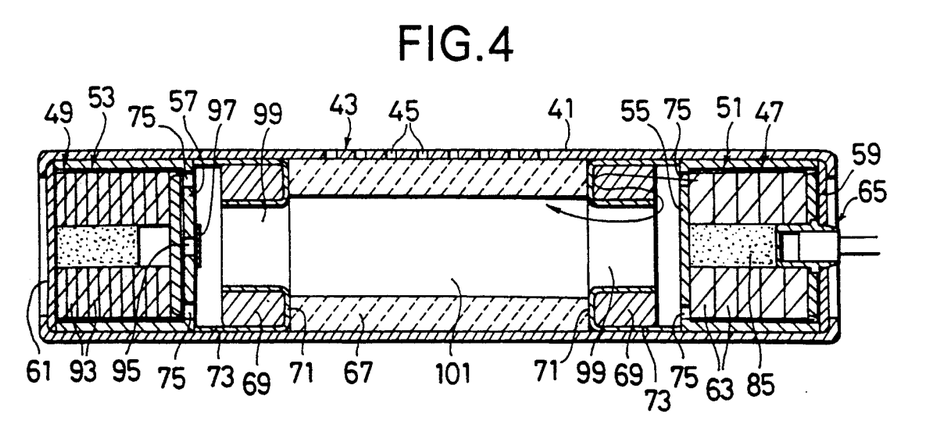
FIG. 4 is a longitudinal sectional view of another embodiment of the air bag inflation gas generator according to the present invention.

FIG. 4 shows another embodiment of the air bag inflation gas generator according to the present invention. In this embodiment, the through hole 95 is formed in the center of the separating member 57 constructing the second combustion chamber 53 and a pressure relief valve 97 made of aluminum for instance is fixed to cover the through hole 95.

In the air bag inflation gas generator having the above construction, when an electric current is applied to the igniter 65 installed in the first combustion chamber 51, the ignition agent 85 is ignited. Then the ignition causes the gas generating agents 63 to burn and the pressure of the combustion gas breaks the sealed vessel 77. The combustion gas in turn flows into the intermediary filter 69 through the orifices 75 at the separating member 55, collides with the partition 73, turns over, flows into the room 101 surrounded by the final filter 67 through the room 99 in the intermediary filter 69, is purified by the final filter 67, and flows into the air bag through the gas outlets 45.

On the other hand, a high pressure caused by the burning of the gas generating agents 63 in the first combustion chamber 51 is exerted on the separating member 57 of the second combustion chamber 53 with the result that the pressure relief valve 97 bursts. Through the burst part, flame generated from the gas generating agents 63 in the first combustion chamber 51 flows into the second combustion chamber 53 to burn the ignition agent 85, which causes the generating agents 93 in the second combustion chamber 53 to burn after a certain time from the start of the burning of the generating agents 63 in the first combustion chamber 51. Generated gas flows into the intermediary filter 69 through the orifices 75 at the separating member 57 as same as the gas generated in the first combustion chamber 51, turns over in the intermediary filter 69, flows into the room 101 surrounded by the final filter 67 through the room 99 in the center of the intermediary filter 69, and is supplied into the air bag through the final filter 67 and in turn the gas outlets 45 formed in the middle of the cylinder 41.

In the air bag inflation gas generator having the above construction, after 10-20 msec for instance from the start of the burning of the gas generating agents 63 in the first combustion chamber 51, the gas generating agents 93 in the second combustion chamber 53 burn by installing the pressure relief valve 97 at the separating member 57 in the second combustion chamber 53. Therefore, this air bag may fix a passenger to a certain extent and then restrict him or her completely.

Figure 5:
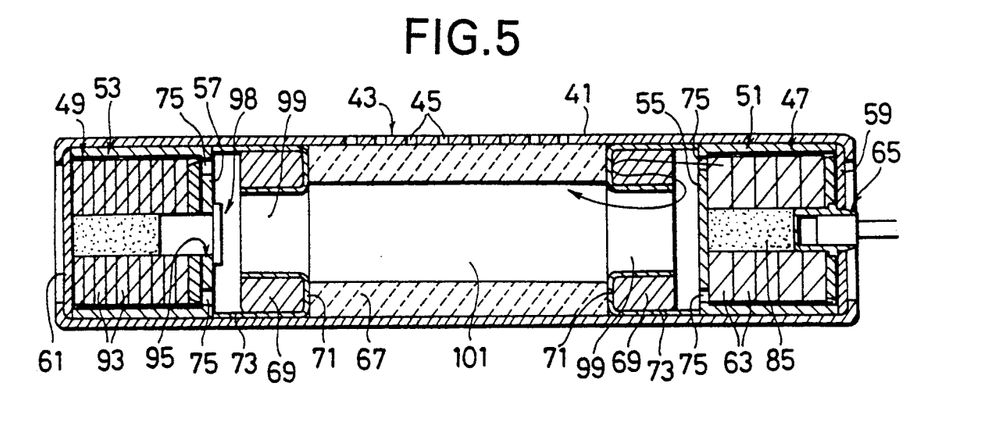
FIG. 5 is a longitudinal sectional view of a third embodiment of the air bag inflation gas generator according to the present invention.

FIG. 5 shows still another embodiment of the air bag inflation gas generator according to the present invention. In this embodiment, the through hole 95 is formed in the center of the separating member 57 constructing the second combustion chamber 53 and a detonator 98 is inserted into the through hole 95 and fixed therein.

Figure 6:
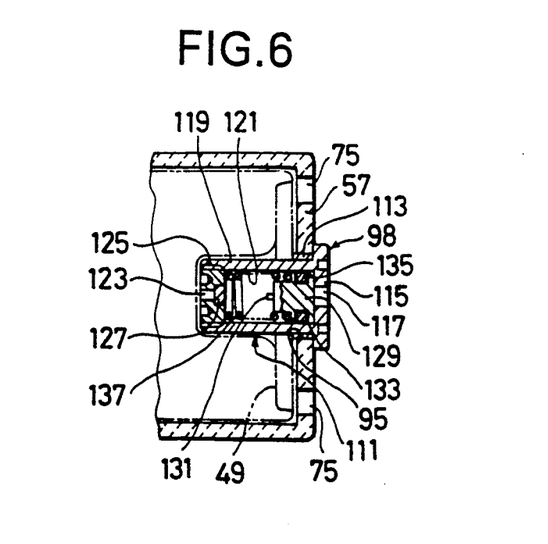
FIG. 6 is a longitudinal sectional view of a detonator accommodated in the second combustion chamber of the generator shown in FIG. 5.

FIG. 6 shows the detonator 98 in detail. In the drawing, the reference numeral 111 indicates a casing screwed up with a thread 113 arranged inside the through hole 95 at the separating member 57.

At the top 115 of the casing 111, a small hole 117 is formed and a big hole 121 at the main body 119.

A detonator holder 125 which has a hole 123 in the center thereof is screwed up at the tip of the main body 119 and a pierced detonator 127 is installed in the center of the inside of the detonator holder 125.

In the hole 121 of the casing 111, a sliding member 129 is arranged and a firing pin 131 is formed at the sliding member 129, sticking toward the pierced detonator 127.

At the top 115 of the sliding member 129, an annular groove 133 is formed and 0-rings 135 are put on the annular groove 133.

A spring 137 is put between the sliding member 129 and the detonator holder 125.

In the air bag inflation gas generator having the above construction, when an electric current is applied to the igniter 65 installed in the first combustion chamber 51, the ignition agent 85 is ignited. Then the ignition causes the gas generating agents 63 to burn and the pressure of the combustion gas breaks the sealed vessel 77. The combustion gas in turn flows into the intermediary filter 69 through the orifices 75 at the separating member 55, collides with the partition 73, turns over, flows into a room 101 surrounded by the final filter 67 through the room 99 in the intermediary filter 69, is purified by the final filter 67, and flows into the air bag through the gas outlets 45.

On the other hand, a high pressure caused by the burning of the gas generating agents 63 in the first combustion chamber 51 is exerted on the separating member 57 of the second combustion chamber. For example, when the pressure at the bottom of the sliding member 129 is in the range of about 30-50 atmosphere, the sliding member 129 may slide toward the pierced detonator 127 holding down the restoring force of the spring 137 and the firing pin 131 at the top of the sliding member 129 sticks into the pierced detonator 127. Then the pierced detonator 127 ignites and causes the ignition agent 85 to burn with the result that the generating agents 93 in the second combustion chamber 53 burn after a certain time from the start of the burning of the generating agents 63 in the first side.

The generated combustion gas flows into the intermediary filter 69 through the orifices 75 at the separating member 57 as same as the gas generated in the first combustion chamber 51, turns over in the intermediary filter 69, flows into the room 101 surrounded by the final filter 67 through the room 99 in the center of the intermediary filter 69, passes through the final filter 67, and flows into the air bag through the gas outlets 45 formed in the middle of the cylinder 41.

In the air bag inflation gas generator having the above construction, after 10-20 msec for instance from the start of the burning of the generating agents 63 in the first combustion chamber 51, the gas generating agents 93 in the second combustion chamber 53 burn by installing the detonator 98 at the separating member 57 in the second combustion chamber 53. Therefore, this air bag may fix a passenger to a certain extent and then restrict him or her completely.

Figure 7:
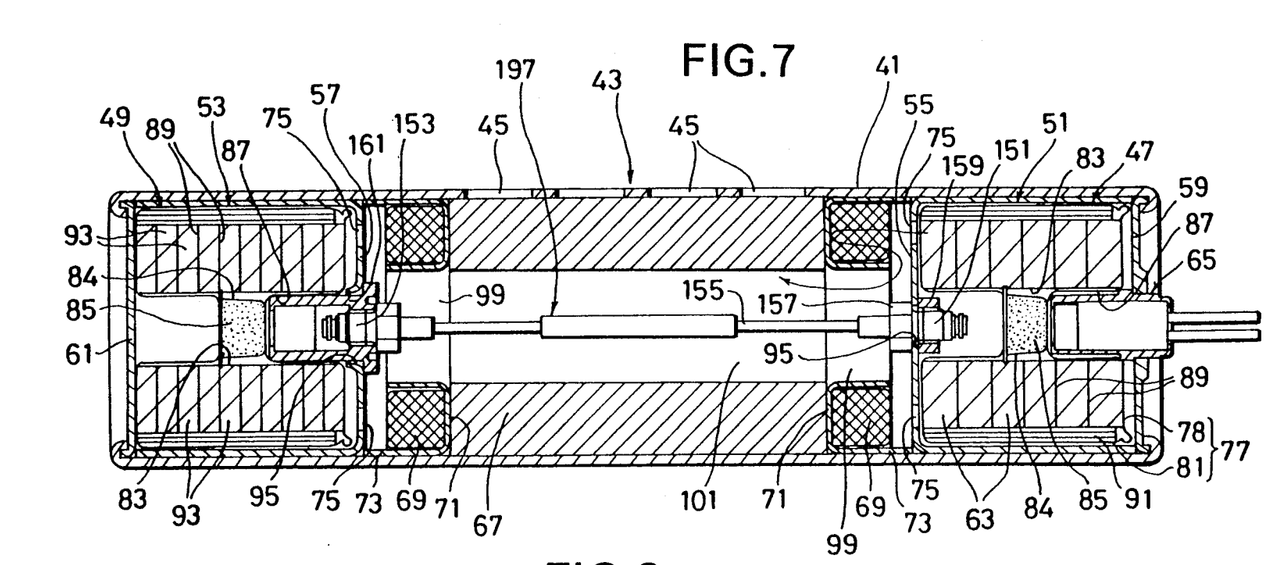
FIG. 7 is a longitudinal sectional view of a fourth embodiment of the air bag inflation gas generator according to the present invention.

FIG. 7 shows another embodiment of the air bag inflation gas generator according to the present invention. In this embodiment, the first combustion chamber 51 is connected to the second combustion chamber 53 by using a conductor 197 igniting the gas generating agents 93 in the second combustion chamber 53 after a certain time from the start of the burning of the gas generating agents 63 in the first combustion chamber 51.

In this embodiment, the conductor 197 is RDC (Rapid Deflagration Cord manufactured by Teledyne McCormick Selph Co.).

In the centers of the separating members 55, 57 constructing the first and second combustion chambers 51, 53, the through holes 95 are formed and an input member 151 and an output member 153 are respectively inserted into the through hole 95 and fixed.

The input member 151 and the output member 153 are connected to each other by using a fuse 155 into which power is charged along the axis.

The input member 151 is fixed to the separating member 55 at a top 157 formed in the input member 151 with a nut 159.

Also the output member 153 is screwed and fixed into a holder 161 screwed into the separating member 57.

In the air bag inflation gas generator having the above construction, when an electric current is applied to the igniter 65 installed in the first combustion chamber 51, the ignition agent 85 is ignited. Then the ignition causes the gas generating agents 63 to burn and the pressure of the combustion gas breaks the sealed vessel 77. The combustion gas in turn flows into the intermediary filter 69 through the orifices 75 of the separating member 55, collides with the partition 73, turns over, flows into the room 101 surrounded by the final filter 67 through the room 99 in the intermediary filter 69, is purified by the final filter 67, and flows into the air bag through the gas outlets 45.

On the other hand, the burning of the gas generating agents 63 in the first combustion chamber 51 activates the conductor 197 and flame in the first combustion chamber 51 is conducted into the second combustion chamber 53 through the input member 151, the fuse 155 and the output member 153. Then the ignition agent 85 is ignited after a certain time from the start of the burning of the gas generating agents 63 in the first combustion chamber 51 and the gas generating agents 93 in the second combustion chamber 53 start to burn after a certain time from the start of the burning of the gas generating agents 63 in the first combustion chamber 51.

The combustion gas flows into the intermediary filter 69 through the orifices 75 of the separating member 57 as same as the combustion gas in the first combustion chamber 51, turns over in the intermediary filter 69, flows into the room 101 surrounded by the final filter 67 through the room 99 in the intermediary filter 69, passes through the final filter 67, and flows into the air bag through the gas outlets 45 formed in the middle of the cylinder 41.

In the air bag inflation gas generator having the above construction, for example, after 10-20 msec from the start of the burning of the gas generating agents 63 in the first combustion chamber 51, the gas generating agents 93 in the second combustion chamber 53 burn by connecting the first combustion chamber 51 and the second combustion chamber 53 with the conductor 197 igniting the gas generating agents 93 in the second combustion chamber 53 after a certain time from the start of the burning of the gas generating agents 63 in the first combustion chamber 51. Therefore, this air bag may hold a passenger to a certain extent and then restrict him or her completely.

Figure 8:
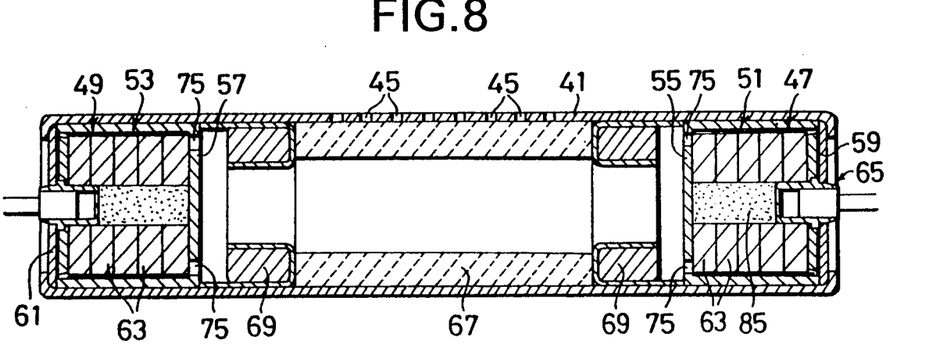
FIG. 8 is a longitudinal sectional view of a fifth embodiment of the gas generator according to the present invention.

In the above embodiments, the thickness of the gas generating agents 64 in the first combustion chamber 51 is different from that of the gas generating agents 93 in the second combustion chamber 53. However, the present invention is not limited to the above embodiments and includes that in which the both combustion chambers 51, 53 have the gas generating agents 63 having the same thickness shown in FIG. 8.

Figure 9:
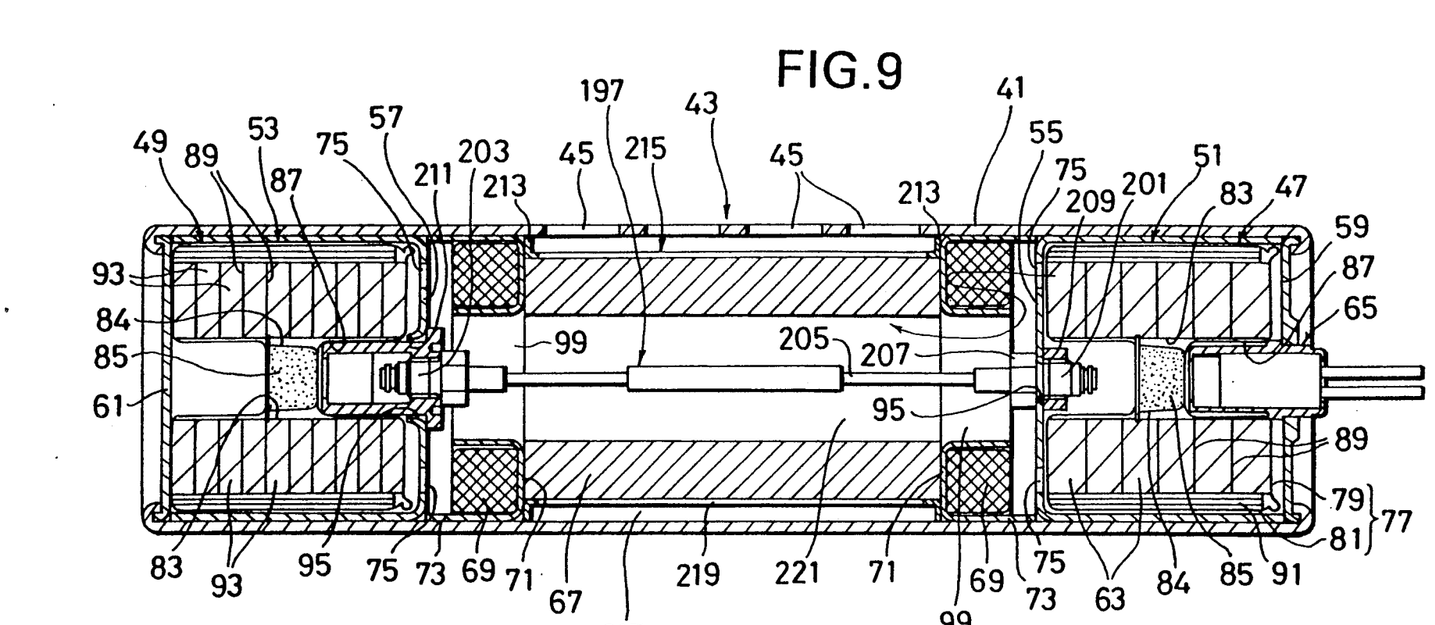
FIG. 9 is a longitudinal sectional view of a sixth embodiment of the air bag inflation gas generator according to the present invention.

FIG. 9 shows one embodiment of the air bag inflation gas generator according to the present invention. In the drawing, the reference numeral 41 shows an elongate cylinder.

A plurality of gas outlets 45 are formed in the upper side of the middle (at which gas flows out) 43 of the cylinder 41.

In the both ends of the cylinder 41, combustion chambers 51, 53 accommodating gas generating agent packs 47, 49 are formed with separating members 55, 57 and lids 59, 61.

In the center of the lid 59 in the right end of the cylinder 41, an igniter 65 for igniting gas generating agents 63 in the combustion chamber 51 is axially installed in the cylinder 41.

A cylindrical final filter 67 is installed inside the middle 43 of the cylinder 41.

The final filter 67 is made of wraparound wire gauze or woven metal wire for instance, cools down the combustion gas to such a low temperature that the air bag may not be burnt, removes any combustion residue contained in the gas, and feeds only harmless nitrogen gas to the air bag.

Between the final filter 67 and the separating members 55, 57 within the cylinder 41, intermediary filters 69 are arranged.

The intermediary filters 69 are accommodated in annular partitions 73 having a bottom 71 each on the side of the final filter 67.

A plurality of orifices 75 are opened in the separating members 55, 57 on the side, facing toward the intermediary filters 69.

The intermediary filters 69 are formed by press molding stainless steel knitted wire cloth for example. Since the combustion gas flow bursting out of the orifices 75 at a high rate dashes into the intermediary filters 69, the intermediary filters 69 serve to change the gas flow into turbulent flow, so that any combustion gas residue may be caught by the filter.

The above mentioned gas generating agent packs 47, 49 include, for example, sealed vessels 77 consisting of aluminum cap 79 and cup 81 each.

In the sealed vessels 77, a plurality of gas generating agents 63, 93 are arranged in the direction along the axial of the cylinder 41 in piled up shape.

Each gas generating agent 63, 93 is formed in disc-like shape having a through hole 83 in the center thereof. Each through hole 83 is charged with an ignition agent 85.

A recess 87 is formed in the side of the lid 59 of each sealed vessel 77 and the igniter 65 is inserted into the recess 87.

Between each of gas generating agents 63, a separator 89 is installed.

These separators 89 are, for example, made of disc-like stainless steel wire cloth of 10-45 mesh, improve ignitability of the gas generating agents 63, 93 and ensure enough passages for the gas from the gas generating agents 63, 93.

Furthermore, along the inner walls of the gas generating agent packs 47, 49, a combustion chamber filters 91, for example, made of wraparound stainless steel wire cloth of 10-35 mesh, are installed. The combustion chamber filters 91 remove any combustion gas residue contained in the gas generated from the gas generating agents 63, 93, cool down the gas and ensure enough exhaust passages for the gas.

In this embodiment, the first combustion chamber 51 is connected to the second combustion chamber 53 by using the conductor 97 igniting the gas generating agents 93 in the second combustion chamber 53 after a certain time from the burning of the gas generating agents 63 in the first combustion chamber 51.

In this embodiment, the conductor 97 is RDC (Rapid Deflagration Cord manufactured by Teledyne McCormick Selph Co.).

In the centers of the separating members 55, 57, the through holes 95 are formed and an input member 201 and an output member 203 are respectively inserted into the through hole 95 and fixed.

The input member 201 and the output member 203 are connected to each other by using a fuse 205.

The input member 201 is fixed to the separating member 55 at a top 207 formed in the input member 201 with a nut 209.

Also the output member 203 is screwed and fixed into a holder 211 screwed into the separating member 57.

In this embodiment, a separating cylinder 215 having flanges 213 at the both ends thereof surrounds outside the final filter 67 and an annular gas transport room 217 is formed between the middle 43 of the cylinder 41 and the final filter 67.

In the separating cylinder 215, a plural elongate oval holes 219 are formed along the axial direction at regular angles from the center of the cylinder 215.

In the air bag inflation gas generator having the above construction, when an electric current is applied to the igniter 65 installed in the first combustion chamber 51, the ignition agent 85 is ignited. Then the ignition causes the gas generating agents 63 to burn and the pressure of the combustion gas breaks the sealed vessel 77. The combustion gas in turn flows into the intermediary filter 69 through the orifices 75 of the separating member 55, collides with the partition 73, turns over, flows into the room 121 surrounded by the final filter 67 through the room 99 of the intermediary filter 69, is purified by the final filter 67, and flows into the air bag through the gas outlets 45.

On the other hand, the burning of the gas generating agents 63 in the first combustion chamber 51 activates the conductor 197 and flame in the first combustion chamber 51 is conducted into the second combustion chamber 53 through the input member 201, the fuse 205 and the output member 203. Then the ignition agent 85 is ignited after a certain time from the start of the burning of the gas generating agents 63 in the first combustion chamber 51 and the gas generating agents 93 in the second combustion chamber 53 start to burn after a certain time from the start of the burning of the gas generating agents 63 in the first combustion chamber.

The combustion gas flows into the intermediary filter 69 through the orifices 75 of the separating member 57 as same as the combustion gas in the first combustion chamber 51, turns over in the intermediary filter 69, flows into the room 221 surrounded by the final filter 67 through the room 99 in the center of the intermediary filter 69, passes through the final filter 67, and flows into the air bag through the gas outlets 45 formed in the middle of the cylinder 41.

In the air bag inflation gas generator having the above construction, by forming the combustion chambers 51, 53 accommodating the gas generating agents 63, 93 in the elongate cylinder 41 with the separating members 55, 57, making the gas outlets 45 opening to one way in a gas outlet area (the middle 43) of the cylinder 41 except the combustion chambers 51, 53, installing the cylindrical final filter 67 inside the middle 43 of the cylinder 41, and forming the gas transport room 217 between the middle 43 of the cylinder 41 and the final filter 67, the purification efficiency of the final filter can be remarkably increased compared with the prior art.

In the air bag inflation gas generator having the above construction, when the gas generating agents 63, 93 burn in the combustion chamber 51, 53, the combustion gas flows out of the combustion chamber 51, 53 through the orifices 75 of the separating members 55, 57 into the intermediary filters 69 and into inside the final filter 67, passes through the final filter 67 and the gas transport room 217, moves toward the gas outlets 45, and flows into the air bag through the gas outlets 45. Therefore, transport room is ensured for the combustion gas flowing into the final filter 67 in the oppsite side to the gas outlets 45, so that the combustion gas may flow through all over the final filter 67 with the result that the purification efficiency of the final filter 67 can be remarkably increased compared with the prior art.

Furthermore, in the air bag inflation gas generator having the above construction, by forming the combustion chambers 51, 53 at the both ends of the cylinder 41 thereby supplying the gas into the air bag through the gas outlets 45 in the middle 43 of the cylinder 41, the volume of the combustion gas produced can be remarkably increased compared with the prior generator.

Figure 10:
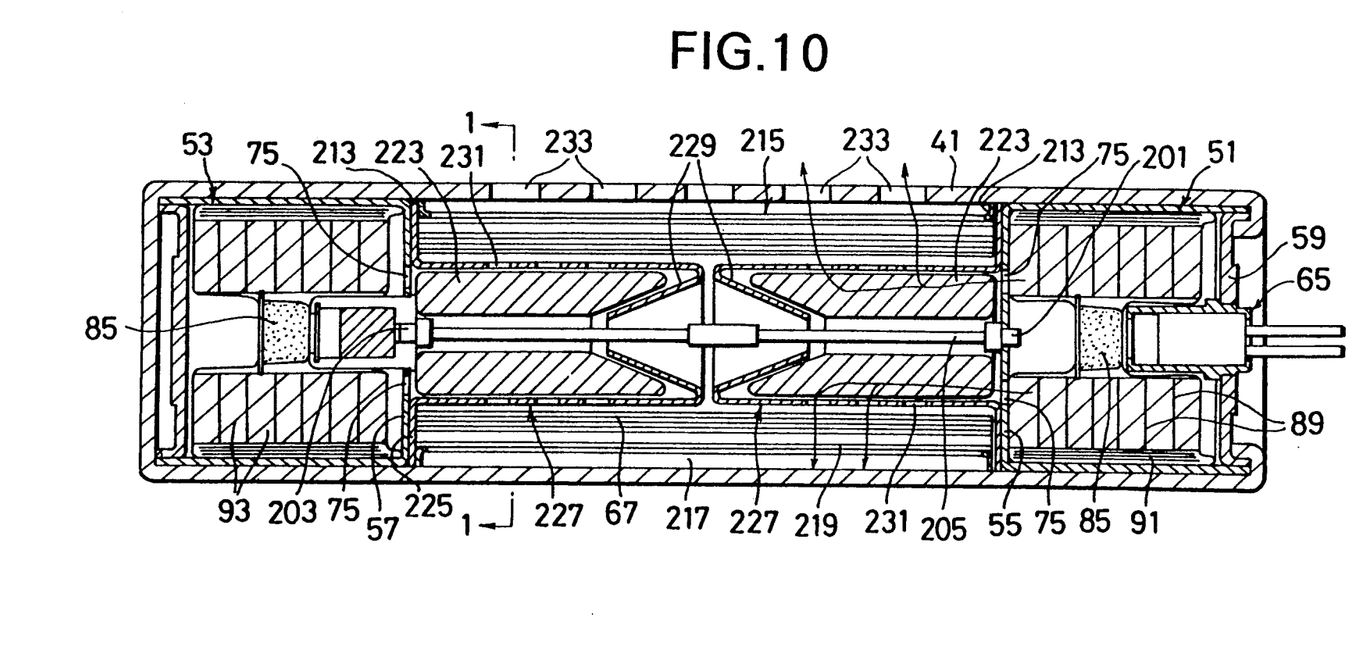
FIG. 10 is a longitudinal sectional view of a seventh embodiment of the air bag inflation gas generator according to the present invention.
Figure 11:
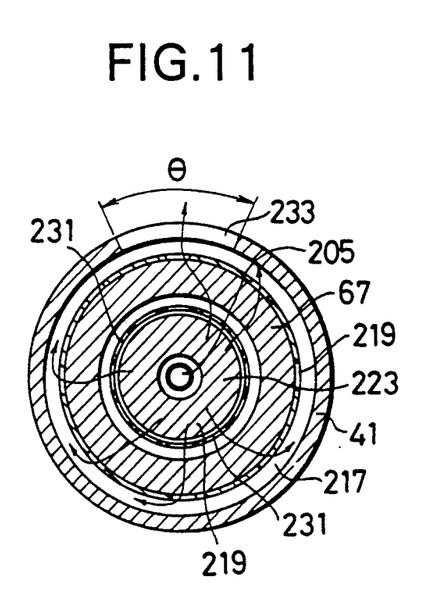
FIG. 11 is a transverse sectional view taken on line 1—1 shown in FIG. 10.
Figure 12:
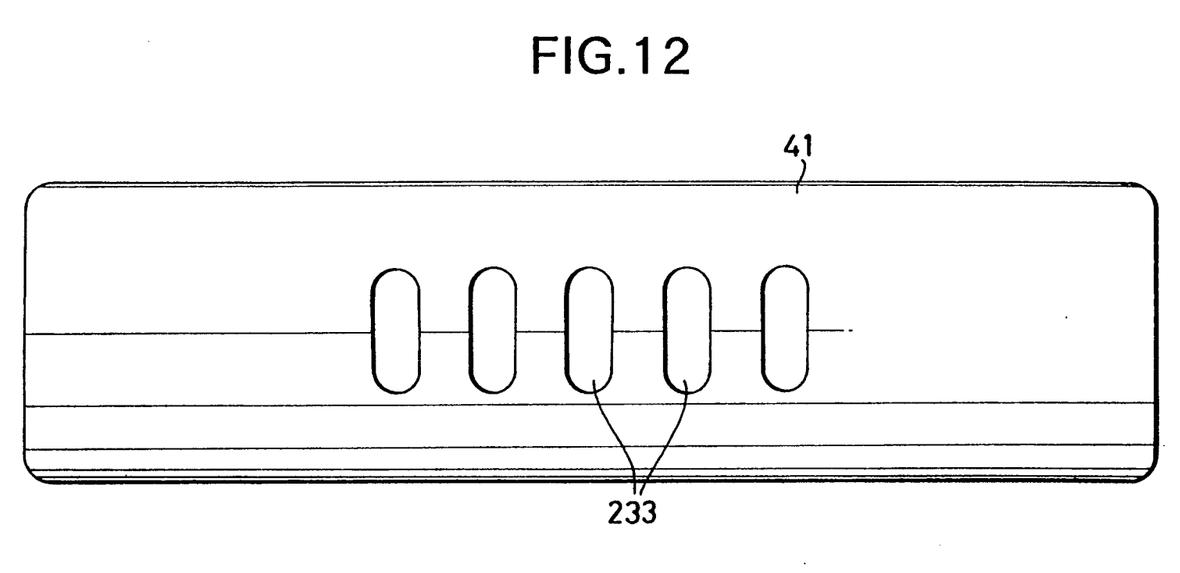
FIG. 12 is a top elevational view of the gas generator shown in FIG. 10.

FIGS. 10 to 12 show other embodiments of the air bag inflation gas generator according to the present invention. In this embodiment, a pair of intermediary filters 223 is installed inside the final filter 67.

These intermediary filters 223 are formed by press molding stainless steel knitted wire cloth, for example, and serve to change the gas flow into turbulent flow, so that any combustion residue can be caught by the knitted wire cloth.

These intermediary filters 223 are accommodated in separating cylinders 227 having flanges 225 in the one side thereof. And in the other side of the separating cylinders 227, inwardly protruding conical supports 229 are formed.

Furthermore, the separating cylinders 227 have a plurality of through holes 231 for conducting the combustion gas in the intermediary filters 223 to the final filter 67.

In this embodiment, a plurality of gas outlets 233 are formed, for example, to have a approximately 50-degree angle at regular intervals, along the axis of the cylinder 41, in the first side of the cylinder 41.

In the air bag inflation gas generator having the above construction, when an electric current is applied to the igniter 65 installed in the first combustion chamber 51, the ignition agent 85 is ignited. Then the ignition causes the gas generating agents 63 to burn and the pressure of the combustion gas breaks the sealed vessel 77. The combustion gas in turn flows into the intermediary filter 223 through the orifices 75 of the separating member 55, collides with the conical support 229 of the separating cylinder 227, turns over, flows into the final filter 67 through the through holes 231 of the separating cylinder 227, is purified by the final filter 67, passes through the gas transport room 217, and flows into the air bag through the gas outlets 233.

On the other hand, the burning of the gas generating agents 63 in the first combustion chamber 51 activates the conductor 197 and flame in the first combustion chamber 51 is conducted into the second combustion chamber 53 through the input member 201, the fuse 205 and the output member 203. Then the ignition agent 85 is ignited after a certain time from the start of the burning of the gas generating agents 63 in the first combustion chamber 51 and the gas generating agents 63 in the second combustion chamber 53 start to burn after a certain time from the start of the burning of the gas generating agents 63 in the first combustion chamber.

The combustion gas is conducted to the gas outlets 233 in the same manner as the combustion gas in the first combustion chamber 51, and flows into the air bag through the gas outlets 233.

Also in the air bag inflation gas generator having the above construction, the same effects as the embodiment shown in FIG. 9 are obtained.

In the aforementioned embodiments, the combustion chambers are formed at both ends of the cylinder 41. However, the present invention is not limited to the above embodiments and the combustion chamber may be installed in only one end of the cylinder 41.

What is claimed is:

1. An air bag inflation gas generator comprising a first combustion chamber and a second combustion chamber accommodating gas generating agents formed with separating members in both ends of an elongate cylinder having gas outlets in the middle thereof, a cylindrical final filter installed coaxially inside the middle of the cylinder, intermediary filters installed between the final filter and the separating members in the cylinder, and orifices, facing toward the intermediary filters, opened in the separating members for permitting gas generated in the combustion chambers to pass therethrough prior to passing through the intermediary filters and the final filters and then through the gas outlets to the air bag.

2. An air bag inflation gas generator according to claim 1, wherein both combustion chambers respectively have an igniter.

3. An air bag inflation gas generator according to claim 1, wherein a plurality of annular gas generating agents are piled up axially and the thickness of each of the gas generating agents charged in the second combustion chamber is substantially one-half that of each of the gas generating agents in the first combustion chamber.

4. An air bag inflation gas generator according to claim 1 and further comprising an igniter installed in at least one of the combustion chambers; wherein after a certain time from the start of the burning of the gas generating agents in the first combustion chamber, the gas generating agents in the second combustion chamber start to burn.

5. An air bag inflation gas generator according to claim 4, wherein the burning of the gas generating agents in the first combustion chamber causes the generating agents in the second combustion chamber to burn.

6. An air bag inflation gas generator according to claim 4, wherein a plurality of annular gas generating agents are piled up axially and the thickness of each of the gas generating agents charged in the second combustion chamber is substantially one-half that of each of the gas generating agents of the first combustion chamber.

7. An air bag inflation gas generator according to claim 1 and further comprising an igniter installed in the first combustion chamber, and a pressure relief valve installed at the separating member of the second combustion chamber.

8. An air bag inflation gas generator according to claim 1 and further comprising an igniter installed in the first combustion chamber and a detonator, which ignites when the inside pressure of the cylinder reaches to a specified value, installed at the separating member of the second combustion chamber.

9. An air bag inflation gas generator according to claim 1 and further comprising an igniter installed in the first combustion chamber; wherein the first combustion chamber is connected to the second combustion chamber with a conductor igniting the gas generating agents in the second combustion chamber after a certain time from the start of the burning of the gas generating agents in the first combustion chamber.

10. An air bag inflation gas generator according to claim 1, and further comprising annular partitions each having a bottom and being formed at each end of the cylindrical final filter, the intermediary filters being accommodated in the annular partitions and the orifices opening in the separating members in such manner as to permit gas generated in the combustion chambers to pass therethrough and into the corresponding intermediary filters, which latter serve to change the gas flow into a turbulent flow so that any combustion gas residue is caught in the intermediary filter.

11. An air bag inflation gas generator according to claim 3, wherein there are provided twice as many of the gas generating agents in the second combustion chamber as in the gas generating agents in the first combustion chamber.

12. An air bag inflation gas generator according to claim 11, wherein there are ten of the gas generating agents charged in the second combustion chamber and there are five gas generating agents in the first combustion chamber, so that a combustion specific surface area of the gas generating agents, which start to burn late, accommodated in the second combustion chamber is larger than that of the gas generating agents accommodated in the first combustion chamber and volume per time of the combustion gas of the generating agents in the second combustion chamber is bigger than that of the gas generating agents in the first combustion chamber with the result that capacity per time of the deploying air bag may be controlled.

* * * * *

UNITED STATES PATENT AND TRADEMARK OFFICE
CERTIFICATE OF CORRECTION

PATENT NO. : 5,219,178
DATED : June 15, 1993
INVENTOR(S) : Kobari, H. et al It is certified that error appears in the above-identified patent and that said Letters Patent is hereby corrected as shown below:

On the title page, at [73], replace

"Assignee: Nippon Koki Co., Ltd., Tokyo, Japan" with

--Assignees: Nippon Koki Co., Ltd., Tokyo, Japan and Honda Giken Kogyo Kabushiki Kaisha, Tokyo, Japan--.

Signed and Sealed this

Thirtieth Day of August, 1994

*Attest:*

BRUCE LEHMAN

*Attesting Officer*     *Commissioner of Patents and Trademarks*